(12) United States Patent
Ali et al.

(10) Patent No.: US 8,868,882 B2
(45) Date of Patent: Oct. 21, 2014

(54) STORAGE ARCHITECTURE FOR BACKUP APPLICATION

(75) Inventors: Abid Ali, Andhra Pradesh (IN); Amit Singla, Redmond, WA (US); Vanita Prabhu, Andhra Pradesh (IN); Sachin Durge, Andhra Pradesh (IN); Pankaj Khanzode, Andhra Pradesh (IN); Vijay Sen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 125 days.

(21) Appl. No.: 13/155,401

(22) Filed: Jun. 8, 2011

(65) Prior Publication Data

US 2012/0317379 A1 Dec. 13, 2012

(51) Int. Cl.
*G06F 9/26* (2006.01)
*G06F 13/28* (2006.01)

(52) U.S. Cl.
CPC ...................................... *G06F 13/28* (2013.01)
USPC .......................................... 711/206; 711/202

(58) Field of Classification Search
CPC combination set(s) only.
See application file for complete search history.

(56) References Cited

U.S. PATENT DOCUMENTS

| | | | |
|---|---|---|---|
| 7,478,101 B1 | 1/2009 | Manley | |
| 7,676,502 B2 | 3/2010 | Atluri et al. | |
| 2005/0131996 A1 | 6/2005 | Mastrianni et al. | |
| 2005/0169064 A1 | 8/2005 | Kiselev et al. | |
| 2005/0204099 A1* | 9/2005 | Morrow | 711/143 |
| 2006/0206547 A1 | 9/2006 | Kulkarni et al. | |
| 2006/0218544 A1 | 9/2006 | Chakraborty et al. | |
| 2007/0244938 A1 | 10/2007 | Michael et al. | |
| 2007/0276885 A1 | 11/2007 | Valiyaparambil et al. | |
| 2009/0006534 A1 | 1/2009 | Fries et al. | |
| 2009/0150641 A1* | 6/2009 | Flynn et al. | 711/202 |
| 2009/0171888 A1* | 7/2009 | Anglin | 707/2 |
| 2009/0172160 A1 | 7/2009 | Klein | |
| 2010/0205369 A1 | 8/2010 | Chang | |
| 2010/0250891 A1 | 9/2010 | Shalev | |
| 2010/0262586 A1 | 10/2010 | Rosikiewicz | |
| 2010/0325384 A1* | 12/2010 | Ryu et al. | 711/209 |
| 2010/0332549 A1 | 12/2010 | Nichols et al. | |
| 2011/0016095 A1* | 1/2011 | Anglin et al. | 707/692 |
| 2011/0106768 A1 | 5/2011 | Khanzode | |
| 2011/0107052 A1* | 5/2011 | Narayanasamy | 711/171 |
| 2012/0011340 A1* | 1/2012 | Flynn et al. | 711/171 |

OTHER PUBLICATIONS

"Cloud Storage Deduplication", Retrieved at <<http://www.storage-switzerland.com/Articles/Entries/2009/6/5_Cloud_Storage_Deduplication.html>>, Jun. 5, 2009, pp. 2.

"Virsto One", Retrieved at <<http://virsto.com/products/virsto-one-capabilities>>, Retrieved Date: Mar. 23, 2011, pp. 2.

(Continued)

*Primary Examiner* — Charles Rones
*Assistant Examiner* — Han Doan
(74) *Attorney, Agent, or Firm* — Jim Sfekas; Kate Drakos; Micky Minhas

(57) ABSTRACT

Aspects of the subject matter described herein relate to a storage architecture. In aspects, an address provided by a data source is translated into a logical storage address of virtual storage. This logical storage address is translated into an identifier that may be used to store data on or retrieve data from a storage system. The address space of the virtual storage is divided into chunks that may be streamed to the storage system.

19 Claims, 6 Drawing Sheets

(56) References Cited

OTHER PUBLICATIONS

"The Current State of Bacula", Retrieved at http://www.bacula.org/en/dev-manual/main/main/Current_State_Bacula.html>>, Retrieved Date: Mar. 23, 2011, pp. 4.
"Cisco I/O Accelerator Deployment Guide", Retrieved at <<http://www.cisco.com/en/US/prod/collateral/ps4159/ps6409/ps6028/ps10531/guide_c07-580411.html>>, Jan. 2010, pp. 25.
"Capability: Data Protection and Recovery", Retrieved at <<http://technet.microsoft.com/en-us/library/bb821259.aspx>>, Retrieved Date: Mar. 23, 2011, pp. 8.
International Search Report mailed Dec. 27, 2012 for Application No. PCT/US2012/039881, 9 pages.
"A Guide to Windows Vista Backup Technologies", Retrieved at <<http://technet.microsoft.com/en-us/magazine/2007.09.backup.aspx>> Aug. 7, 2009, pp. 1-9.
"Running a Domain Controller in Virtual Server 2005", Retrieved at <<http://download.microsoft.com/download/1/8/4/18450ebb-bd47-47b4-9957-40f185fbbaa7/DC_VS2005.doc>> Nov. 2004, pp. 1-34.
"Performance Tuning Guidelines for Windows Server 2008", Retrieved at <<http://download.microsoft.com/download/9/c/5/9c5b2167-8017-4bae-9fde-d599bac8184a/Perf-tun-srv.docx>> May 20, 2009, pp. 1-83.
"Deploying Citrix XenServer 5.0 with Dell EqualLogic PS Series storage", Retrieved at <<http://webjam-upload.s3.amazonaws.com/citrix-xenserver-equallogic_final_c07a087e890643ed9786c3f82f4ebeb6_3669_.pdf>> pp. 1-29.
"Citrix Xenserver V5.0 and Netapp Storage Best Practices", Retrieved at <<http://www.citrix.lu/site/resources/dynamic/partnerDocs/CitrixXenServerv50andNetAppStorageBestPracticesGuide.pdf>> Mar. 2009 | Version 2.1, pp. 1-79.
U.S. Appl. No. 12/609,244, Non-Final Rejection dated Mar. 16, 2012, 13 pages.
U.S. Appl. No. 12/609,244, Amendment dated Aug. 2, 2012, 12 pages.
U.S. Appl. No. 12/609,244, Final Rejection dated Aug. 31, 2012, 13 pages.
U.S. Appl. No. 12/609,244, Amendment After Final Rejection, dated Jan. 31, 2013, 13 pages.

\* cited by examiner

STORAGE ARCHITECTURE FOR BACKUP APPLICATION

BACKGROUND

There are many storage systems which may be used to backup data. For example, tape storage systems have been and are still used to store large datasets. More recently, in part because of a reduction in price per storage unit, locally attached disk storage systems have been used to store backup data. Even more recently, cloud storage systems have become available to store backup data on remote storage devices connected via the Internet. Supporting a new type of storage involves a lot of engineering, testing, and integration effort and adds delay to time to market. In addition, the migration of data from one type of storage to another type of storage is challenging.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to a storage architecture. In aspects, an address provided by a data source is translated into a logical storage address of virtual storage. This logical storage address is mapped to an identifier that may be used to store data on or retrieve data from a storage system. The address space of the virtual storage is divided into chunks that may be streamed to the storage system. Dividing the storage space into chunks facilitates backup dataset management operations, transformations, and other actions described in more detail below.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
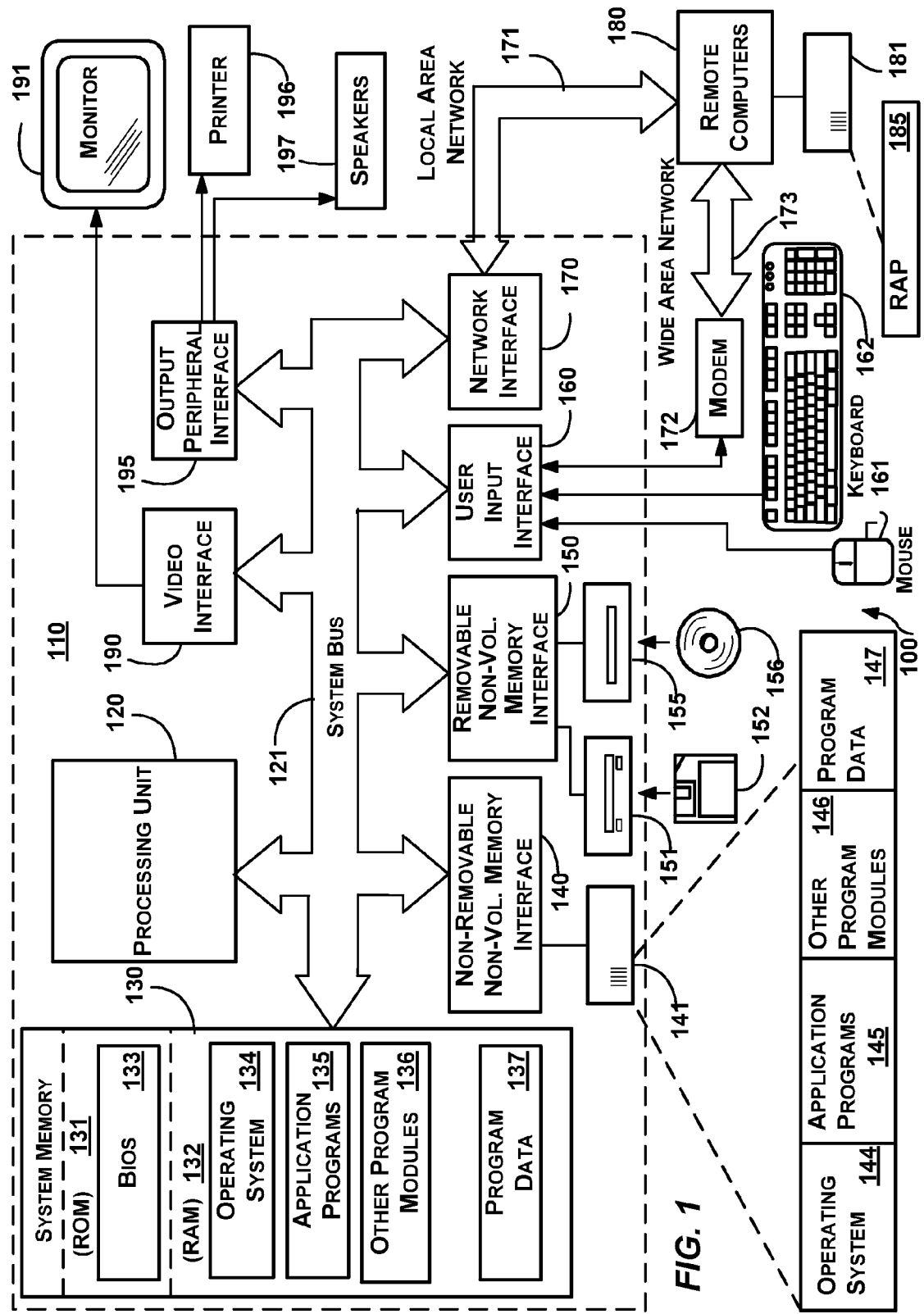
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Storage Architecture

Figure 2:
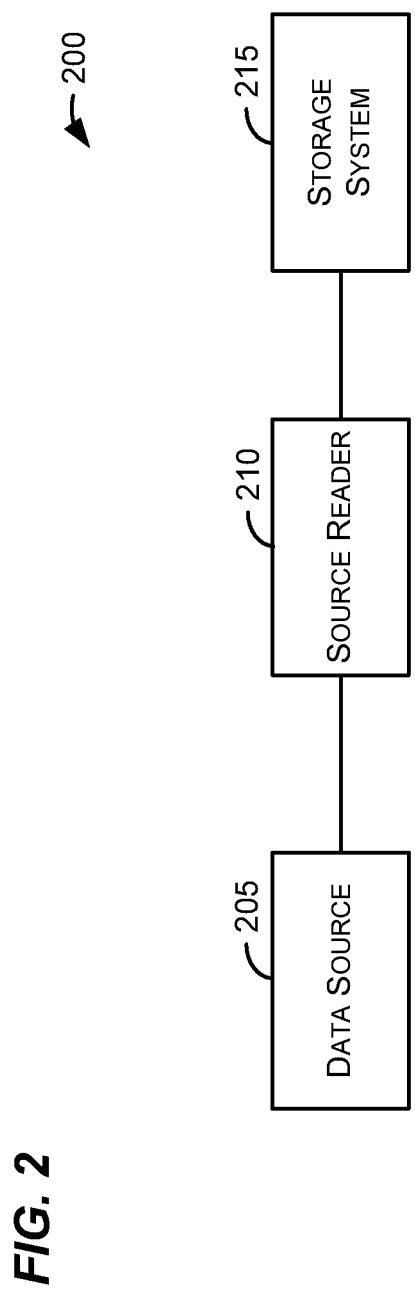
FIG. 2 is a block diagram that generally represents an environment in accordance with aspects of the subject matter described herein.

As mentioned previously, supporting new types of storage and migrating data to new types of storage are challenging. FIG. 2 is a block diagram that generally represents an environment in accordance with aspects of the subject matter described herein. The components illustrated in FIG. 2 are exemplary and are not meant to be all-inclusive of components that may be needed or included. In other embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

Turning to FIG. 2, the environment 200 includes a data source 205, a source reader 210, a storage system 215, and may also include other components (not shown). Each of the data source 205, the source reader 210, and the storage system 215 may be implemented by one or more components. As used herein, the term component is to be read to include hardware such as all or a portion of a device, a collection of one or more software modules or portions thereof, some combination of one or more software modules or portions thereof and one or more devices or portions thereof, and the like.

A component may include or be represented by code. Code includes instructions that indicate actions a computer is to take. Code may also include information other than actions the computer is to take such as data, resources, variables, definitions, relationships, associations, and the like that.

A component may be hosted by one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured host one or more of the components of the system 200 comprises the computer 110 of FIG. 1.

The data source 205, the source reader 210, and the storage system 215 (hereinafter sometimes referred to as the components) may be located relatively close to each other or may be separated by great distances and may be connected to each other via a variety of communications links. Some exemplary communication links that may be employed between the components include wireless connections, wired connections, and other communication media previously mentioned. The communications links may form one or more networks including local networks, inter-office networks, the Internet, and the like.

In one embodiment, the data source 205 may include a backup application that is in charge of backing up a dataset hosted on one or more storage devices. The data source 205 may be operable to read data from the dataset and provide this data to the source reader 210. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

When the data source 205 wants to obtain data from a previously backed up dataset, the data source 205 may request the data from the source reader 210 which may then obtain the data from the storage system 215.

The storage system 215 is a data store that may be used to store data. The storage system 215 may be implemented by one or more storage devices including, for example, hard disks, tape devices, optical storage devices, flash memory, volatile storage devices such as RAM, cloud storage, other storage devices, and the like. The storage system 215 may support storage operations having semantics including CreateEntity, WriteData(entityId, data, offset), ReadData(entityId, offset, length), DeleteEntity(entityId), and the like.

The source reader 210 may receive data from the data source 205 and may package the data in a way that makes it easier to perform various transformations on the data. In one embodiment, the source reader 210 may be implemented in a software storage stack of a computer that hosts the data source 205. As the data source 205 sends data down the storage stack, the source reader 210 may obtain the data, place the data in a data structure, and provide the data to the storage system 215.

Figure 3:
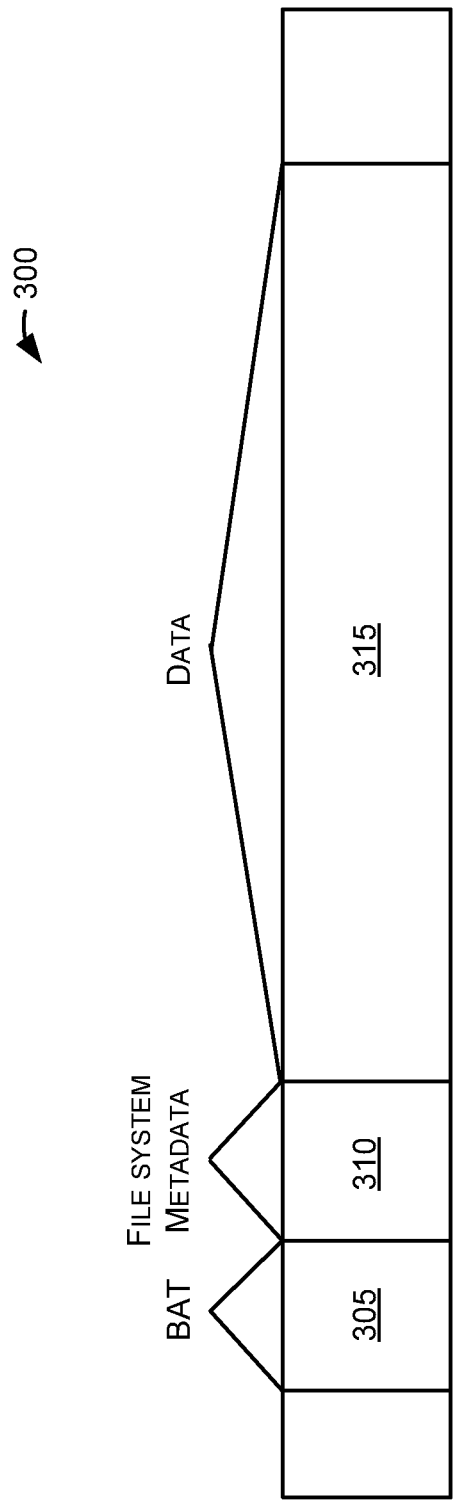
FIG. 3 is a block diagram that illustrates an exemplary virtual storage format in accordance with aspects of the subject matter described herein.

In one embodiment, the source reader 210 may use a format as illustrated in FIG. 3. FIG. 3 is a block diagram that illustrates an exemplary virtual storage format in accordance with aspects of the subject matter described herein. As illustrated, the format 300 includes a block address translation table 305, a file system metadata portion 310, and a data portion 315.

The block address translation table 305 (sometimes referred to herein as the BAT 305) may map from blocks of a file system volume to physical addresses of a storage device. Using this mapping, the BAT 305 may indicate where data of the volume is or would be stored on the storage device.

The word "would" is used above because if the data were stored on the storage device, that is where the data would be stored. Instead of storing data for a volume in the physical address space of a local storage device, however, a source reader residing in the storage stack may send data directed down the storage stack to an external storage system. The source reader may use the destination offset of the volume and the BAT 305 to determine the physical address, but may send the data to external system storage instead of a local storage device.

The application (e.g., a backup application) sending the data may not know where the data is being stored. From the application's perspective, the data is sent to a storage stack component with an address associated with the data such as a volume offset. Instead of storing the data on local storage, a component such as the source reader that resides in the stack may stream the data to a remote storage system. As described in more detail below, the source reader may divide a virtual storage address space into chunks and perform or cause to be performed various transformations such as de-duplication, compression, encryption, and the like before sending the data as transformed to the remote storage system. Data regarding the dividing, transformations, and mapping may also be stored so that when the application requests the data (e.g., using the volume offset), the data may be retrieved from the external storage system, reverse transformed, and combined as needed.

When a source reader receives a request to write data, the source reader may determine one or more of the chunks of the virtual address space that correspond to the address provided by the data source. The source reader may make this determination based on a logical address (e.g., determined via a BAT index) and the length of the data. For example, for data of 32 kilobytes and an address of 64 kilobytes, the source reader may determine using the BAT that this data affects chunk 2 of the virtual address space by dividing the address (64K) by the chunk size (64K) and adding 1 (assuming a starting chunk of 1 instead of zero). When the chunk 2 is full or otherwise to be transmitted, the source reader may stream data in the chunk to the storage system and maintain a data structure (described in more detail below) that maps the chunk to a storage identifier of the storage system.

The file system metadata portion 310 may include metadata about the data 315. For example, the file system metadata 310 may include file and directory attributes, extended data, security data, access data, location information, relationship data, and the like.

The data portion 315 may include content of the file system objects of a file system. A file system object may include a directory, a file, or some other file system object. A file system object is sometimes referred to herein simply as an object.

Figure 4:
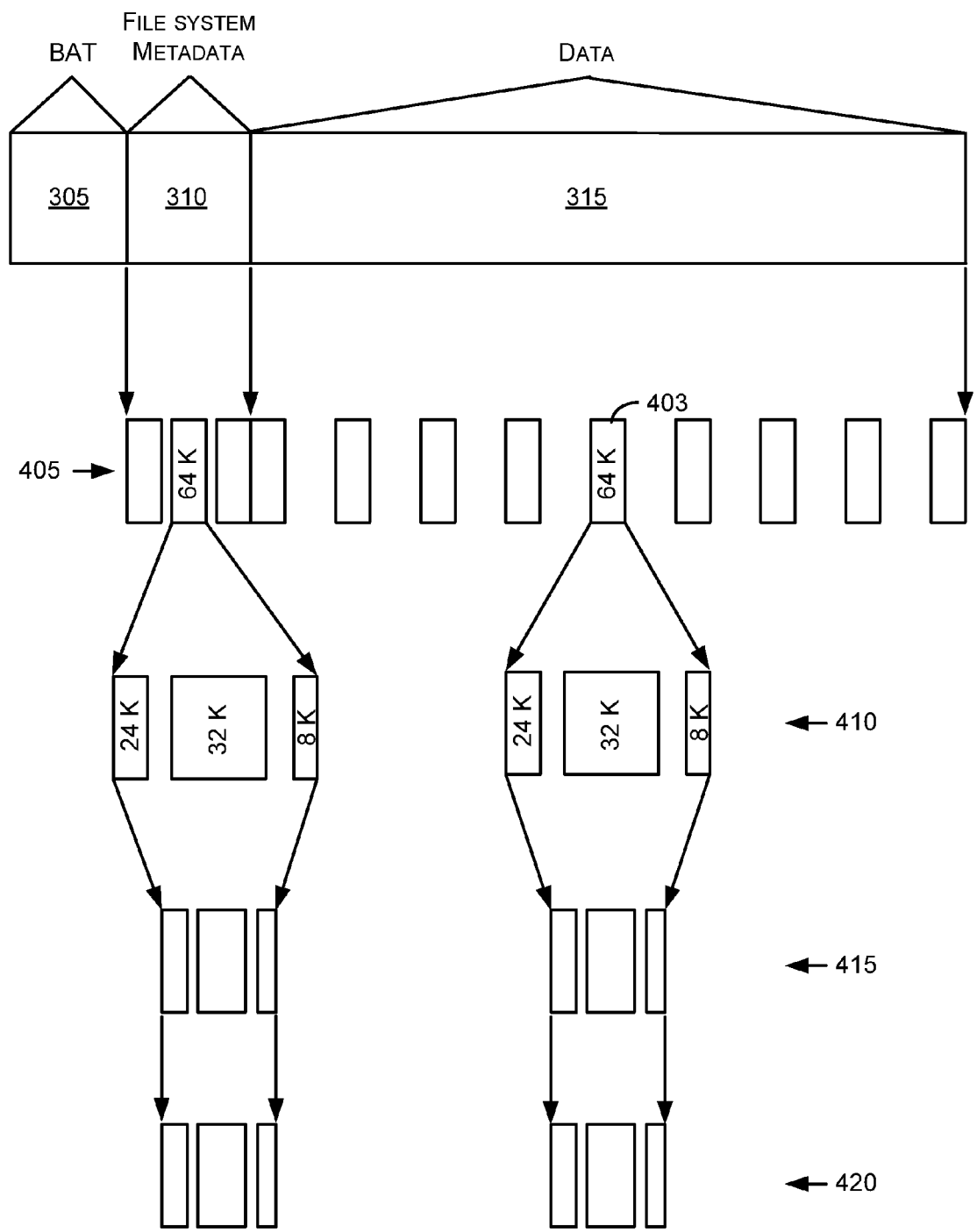
FIG. 4 is a block diagram that illustrates various features in accordance with aspects of the subject matter described herein.

FIG. 4 is a block diagram that illustrates various features in accordance with aspects of the subject matter described herein. The block address translation table 305, file system metadata portion 310, and data portion 315 of FIG. 3 have been replicated in FIG. 4.

In conjunction with storing data of a virtual hard drive, a source reader may perform various actions. For example, a source reader may divide the virtual address storage space of a virtual hard drive into fixed-sized chunks as illustrated at portion 405. The chunk size illustrated in FIG. 4 is 64 kilobytes, but the chunk size may be larger or smaller without departing from the spirit or scope of aspects of the subject matter described herein.

In practice, a chunk size may be selected that is large enough to be useful to further transformations such as a de-duplication transformation, compression transformation, encryption transformation, and the like. Some transformations may, for example, divide a chunk into smaller chunks.

A chunk may have a size that is a multiple of a size of a block of the virtual storage (VS) format. For example, the VS format may have block sizes of 4 kilobytes while the chunk size may be 64 kilobytes.

A table may be used to map between the chunks and the storage system. In one embodiment, the table may map a range of one or more VS addresses to a range of one or more storage identifiers. Below is an exemplary table that maps between VS blocks and storage identifiers:

| VS Offset | Storage Identifier |
|---|---|
| 0-15 | Identifier 1 |
| 16-31 | Identifier 2 |
| ... | ... |
| 1024-1039 | Identifier N |
| ... | ... |

A storage identifier is an identifier (e.g., a number, string, or the like) that may be used to identify data on the storage system. For example, where the storage system models a volume, an identifier may represent an offset into the volume. As another example, the storage system may use the identifier as a key into a table or other data structure. In this example, the identifier may be used to look up in the table a storage device identifier, volume identifier, and a range of addresses corresponding to data associated with the identifier. This information may then be used to obtain the data from a storage device of the storage system.

Although a table has been mentioned above as one mechanism by which chunks of the VS may be mapped to data on the storage system, based on the teachings herein, it will be understood by those skilled in the art that other data structures may be used to perform this mapping. For example, a list, hierarchical data structure, another data structure, or the like may be used to perform the mapping. The term table is used generically to indicate a traditional table or any other data structure that may be used to perform this mapping.

In one embodiment, a table may be used to map the blocks at portion 405 to VS offsets included in the BAT table 305. In this embodiment, a transformation component that divides the blocks of portion 405 into smaller blocks shown in portion 410 is responsible for maintaining data regarding the smaller chunks so that the transformation component can perform a reverse transformation as desired.

In another embodiment, the table may be used to map the blocks at portion 410 to VS offsets include in the BAT table 305. In this embodiment, the table may be used to locate these smaller blocks in the storage system.

A block of portion 405 may be divided into the smaller blocks of portion 410 for use in a de-duplication transformation. In a de-duplication algorithm, duplicated data may be stored just once on the storage system. For example, if data is duplicated among two or more of the blocks created from the block 403, a single instance of the data may be stored on the storage system together with information that indicates the duplication of data. When a block is reconstructed from the single instance, the information may be used to copy the single instance to the multiple blocks in which it was originally found.

At portion 415, a transformation such as a compression algorithm may be applied to the blocks to compress data as desired. At portion 420, a transformation such as an encryption algorithm may be applied to the blocks to encrypt data as desired.

One or more of the transformations at the portions 410, 415, and 420 may be applied before or after the data is sent to the storage system. For example, a source reader may just transmit the blocks at portion 405 to the storage system and allow the storage system to de-duplicate, compress, and encrypt the blocks as desired. As another example, the source reader may de-duplicate, compress, and encrypt the blocks before sending the transformed data to the storage system. All that is needed from the source reader's perspective is a storage system that can store data and retrieve the data using an identifier.

Based on the above, incremental backups may be stored in an efficient manner. If data of the VS changes, instead of resending the entire data of the VS, the chunked block that includes the data and metadata that describes the change may be sent to the storage system.

Retrieval of saved data may also be performed efficiently and with coarse or fine granularity. For example, if a single item is needed, the backup application can request the single item using a range of addresses. The source reader can translate the VS addresses associated with the single item to one or more blocks and obtain the one or more blocks from the storage system. The source reader may then apply reverse transformations, if needed, and return the data to the backup application which can then provide the item to the requestor.

Maintaining backup sets may also be performed efficiently. In some backup schemes, it is desirable to maintain a Grandfather-Father-Son scheme of datasets. An example of a Grandfather-Father-Son scheme is to store weekly backups for the last month, daily backups for the last week, and hourly backups for the last day on the storage system. Based on the mechanism described above, the data may be backed up by first sending a complete copy of the data and then sending just the changed blocks to the storage system for each point-in-time backup.

When a backup set is no longer needed, the data from the backup set can logically be merged with the data of a later backup set. This can be done by deleting blocks that are no longer needed and changing metadata as needed.

For example, a first backup set may include blocks identified by identifiers A, B, C, and D. Data in the blocks B and D may change and be represented by B' and D', respectively. The blocks represented by B' and D' may then be copied to the storage system to create a second backup set. Later, when the first backup set is no longer needed, B and D may be deleted and metadata may be changed to indicate that A and C belong to the second backup set.

In some implementations, the file system metadata 310 may be generated and sent to the storage system before sending any of the data 315 to the storage system. In these implementations, data may be recovered even if only a partial backup of the data was performed. To do this, the metadata may be retrieved from the storage system and used to find any data that actually made it to the storage system in the partial backup. The metadata may indicate a location of the data which may then be used to retrieve blocks from the storage system, if they exist. In this way, even if the data only partially made it to the storage system, the data that did make it may be recovered.

Figure 5:
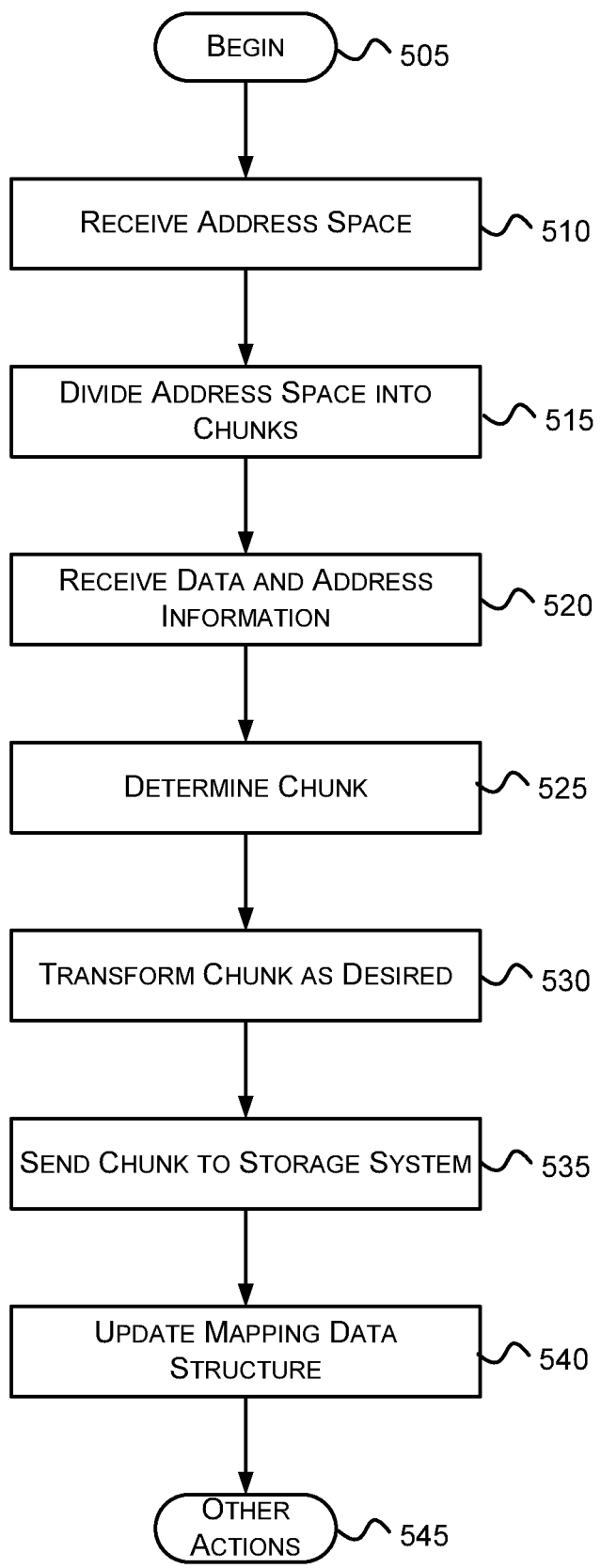
FIGS. 5-6 are flow diagrams that generally represent exemplary actions that may occur in accordance with aspects of the subject matter described herein.
Figure 6:
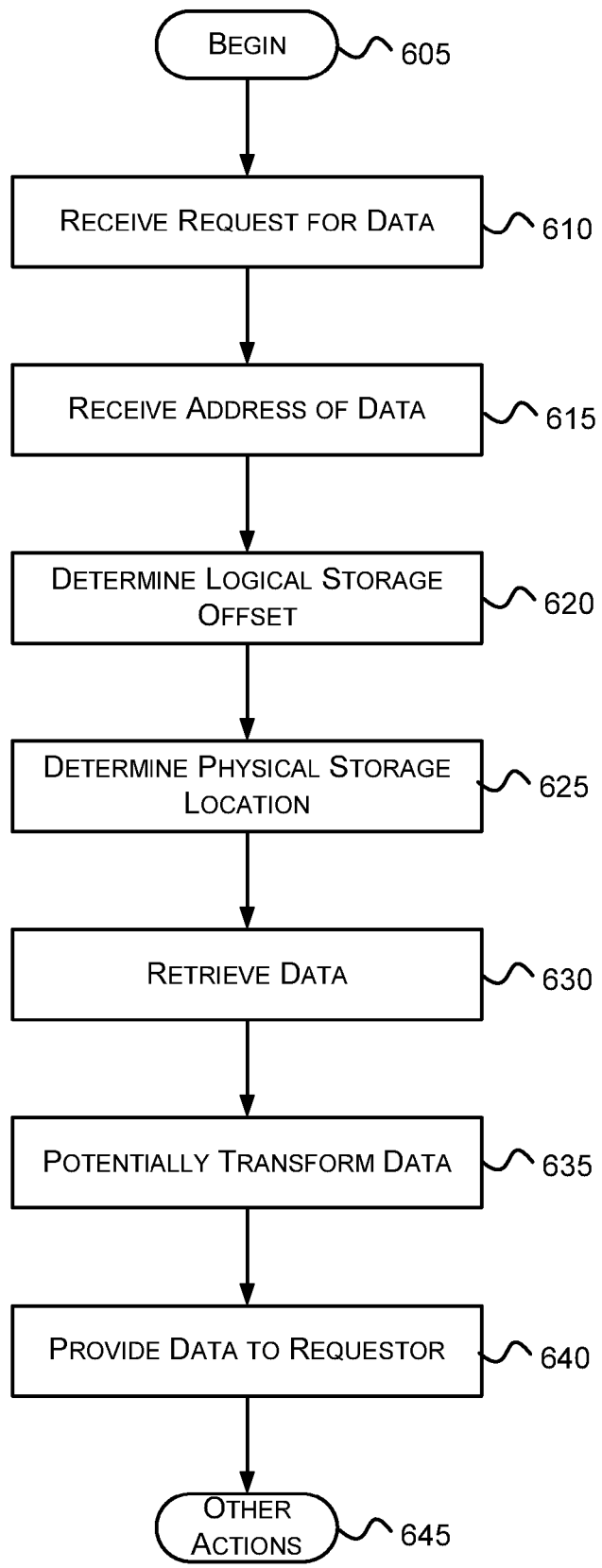

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 5, at block 505, the actions begin. At block 510, an indication of a virtual storage address space is received. For example, referring to FIG. 2, the data source 205 may indicate that it needs a certain amount of space to back up a dataset. In response, the source reader 210 may create virtual storage and allocate a sparse file for the virtual storage. The source reader 210 may then query the file system to obtain an indication of the virtual storage address space associated with the file. In response, the source reader 210 may receive a range of physical addresses corresponding to the virtual storage address space.

At block 515, the address space is divided into chunks. For example, referring to FIGS. 2 and 4, the source reader 210 may divide the address space into the fixed-sized chunks illustrated in portion 405.

At block 520, data is received from the data source. For example, referring to FIG. 2, the source reader 210 may receive data from the data source 205. At block 520, address information associated with the data may also be received. This address information may be conveyed with the data or may be received in another message. For example, referring to FIG. 2, the source reader 210 may receive a volume offset from the data source 205. As another example, the source reader 210 may receive a range of virtual storage addresses associated with the data. As yet another example, the source reader 210 may receive a virtual storage offset and a length of the data.

At block 525, a chunk associated with the data is determined. Determining a chunk may involve using the BAT 305 to obtain a logical address of the virtual storage and then dividing the logical address by the size of the chunks as described previously.

At block 530, the chunk is transformed as desired. This may include further dividing the chunk mentioned above into smaller chunks before performing a transformation such as de-duplication, compression, encryption, or some other transformation.

At block 535, the data corresponding to the chunk is provided to the storage system. For example, referring to FIGS. 2 and 4, the source reader 210 may provide the data corresponding to the block 403 to the storage system 215. The data may be provided as a collection of smaller chunks or as a single chunk.

At block 540, a mapping data structure is updated to map from the address information to an identifier that identifies the chunk to the storage system. For example, referring to FIG. 2, the source reader 210 may update a row of a table that has a first field that stores a range of addresses (e.g., offsets into the virtual storage) and a second field that stores an identifier that may be used to retrieve the data from the storage system. This identifier may, for example, also be a range of addresses, a string, number, or the like as mentioned previously.

At block 545, other actions, if any, may be performed. Other actions may include, for example, backup maintenance actions. For example, a first backup set may be merged with a second backup set stored on the storage by sending a message to delete one or more blocks of the first backup set to the storage system and sending metadata to the storage system that indicates that other of the blocks of the first backup set are to be included in the second backup set.

Turning to FIG. 6, at block 605, the actions begin. At block 610, a request for data that is stored on a storage system is received from the requestor. For example, referring to FIG. 2, the source reader 210 may receive a request for data on the storage system 215 from the data source 205.

At block 615, the address of the data may be received. For example, referring to FIG. 2, the source reader 210 may receive an address of the data from the data source 205. The address of the data may be received together with or separately from the request for the data. For example, the address of the data may be received in a different message or the same message as conveys the request for the data.

The address of the data indicates a storage location that the requestor associates with the data. For example, the data source 205 may associate a volume offset with the data. Although the data may not be actually stored at the volume offset, this the storage location that the requestor associates with the data.

At block 620, a logical storage offset is determined based on the first address and a mapping data structure. For example, referring to FIGS. 2 and 4, the source reader 210 may use the BAT 305 and the address it received to determine a logical storage offset of the virtual storage represented in FIG. 4. As illustrated in FIG. 4, this virtual storage address space of the virtual storage is divided into chunks. These chunks are mapped to storage locations of the storage system via a data structure such as a table. The data structure provides mapping information between the address space recognized by the requestor and the virtual storage address space.

At block 625, a physical storage location is determined. For example, referring to FIGS. 2 and 4, the source reader 210 may map the block 403 to an identifier that may be used to retrieve the data of block 403 from the storage system 215.

At block 630, data corresponding to the requested data (e.g., at least one chunk) is retrieved from the storage system using the identifier described above.

At block 635, the data is transformed. For example, referring to FIGS. 2 and 4, the source reader 210 and/or the storage system 215 may perform reverse transformations corresponding to the portions 420, 415, and 410. For example, the source reader 210 and/or the storage system 215 may decrypt the data, decompress the data, reverse a de-duplication previously applied to the data, or perform one or more other transformations.

In one embodiment, the data may be transformed prior to being transmitted by the storage system. In another embodiment, the data may be transformed after being transmitted by the storage system. In yet another embodiment, the data may undergo one or more transformations before being transmitted by the storage system and one or more transformations after being transmitted by the storage system.

At block 640, the data is provided to the requestor. For example, referring to FIG. 2, the source reader 210 may provide the data to the data source 205.

At block 645, other actions, if any, may be performed.

As can be seen from the foregoing detailed description, aspects have been described related to a storage architecture. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving an indication of a virtual storage address space;
   dividing the virtual storage address space into fixed-sized chunks;
   receiving data from a data source;
   receiving address information associated with the data;
   determining at least one of the chunks based on the address information and a block address translation table that maps from blocks of a file system volume to physical addresses of a storage device;
   providing the data corresponding to the at least one of the chunks to a storage system;
   updating a data structure to map from the address information to an identifier that identifies the at least one of the chunks to the storage system;
   merging a first backup set and a second backup set stored on the storage system by sending a message to delete one or more blocks of the first backup set to the storage system and sending metadata to the storage system that indicates that other of the blocks of the first backup set are to be included in the second backup set; and
   generating metadata regarding a backup dataset that includes the at least one of the chunks and providing the metadata regarding the backup dataset to the storage system prior to sending the at least one of the chunks, the metadata regarding the backup dataset indicating a location of the at least one of the chunks, the metadata regarding the backup dataset is used for obtaining the at least one chunk from the backup dataset even if other data of the backup dataset is not stored on the storage system.

2. The method of claim 1, wherein receiving an indication of a virtual storage address space comprises receiving a range of addresses corresponding to the virtual storage address space.

3. The method of claim 2, wherein updating a data structure to map from the address to an identifier comprises updating a first field and a second field of a row of a table, the updating the first field comprising storing the range of addresses in the first field, the updating the second field comprising placing a second range of addresses corresponding to storage of the storage system in which the data is or will be stored in the second field, the second range of addresses corresponding to the identifier.

4. The method of claim 1, wherein receiving address information associated with the data comprises receiving a virtual storage offset and a length of the data.

5. The method of claim 1, further comprising dividing the at least one of the chunks into smaller chunks and performing a de-duplication using the smaller chunks prior to providing the data to the storage system.

6. The method of claim 1, further comprising compressing the at least one of the chunks prior to providing the data to the storage system.

7. The method of claim 1, further comprising encrypting the at least one of the chunks prior to providing the data to the storage system.

8. A computer storage medium having computer-executable instructions, which when executed perform actions, comprising:
   receiving, from a requestor, a request for data that is stored on a storage system;
   receiving a first address of the data, the first address in a first address space, the first address indicating a storage location the requestor associates with the data;
   determining a second address based on the first address and a data structure, the second address indicating a logical storage offset of a virtual storage address space that is divided into chunks that are mapped to storage locations of the storage system, the data structure provides mapping information between the first address space and the virtual storage address space;
   mapping the second address to a third address, the third address identifying a storage location of at least one of the chunks corresponding to the data on the storage system;
   retrieving the at least one of the chunks from the storage system using the third address;
   providing the data to the requestor, wherein a first backup set and a second backup set stored on the storage system are merged by sending a message to delete one or more blocks of the first backup set to the storage system and sending metadata to the storage system that indicates that other of the blocks of the first backup set are to be included in the second backup set; and
   generating metadata regarding a backup dataset that includes the at least one of the chunks and providing the metadata regarding the backup dataset to the storage system prior to sending the at least one of the chunks, the metadata regarding the backup dataset indicating a location of the at least one of the chunks, the metadata regarding the backup dataset is used for obtaining the at least one chunk from the backup dataset even if other data of the backup dataset is not stored on the storage system.

9. The computer storage medium of claim 8, further comprising performing a transformation on the at least one of the chunks data prior to providing the data to the requestor.

10. The computer storage medium of claim 9, wherein performing a transformation on the at least one of the chunks data prior to providing the data to the requestor comprises decrypting the at least one of the chunks.

11. The computer storage medium of claim 9, wherein performing a transformation on the at least one of the chunks data prior to providing the data to the requestor comprises decompressing the at least one of the chunks.

12. The computer storage medium of claim 9, wherein performing a transformation on the at least one of the chunks data prior to providing the data to the requestor comprises reversing a de-duplication previously applied to the at least one of the chunks.

13. The computer storage medium of claim 9, wherein performing a transformation on the at least one of the chunks data prior to providing the at least one of the chunks to the requestor comprises performing the transformation on a device that hosts the requestor.

14. The computer storage medium of claim 9, wherein performing a transformation on the at least one of the chunks prior to providing the data to the requestor comprises performing the transformation on a device that is part of the storage system.

15. In a computing environment, a system, comprising:
a data source operable to provide data to a source reader, the data source further operable to provide to the source reader a first address that the data source associates with the data; and
a computer comprising the source reader operable to create a virtual storage address space and to divide the virtual storage address space into fixed-sized chunks, the source reader further operable to use a block address translation table that maps from block of a file system volume to physical addresses of a storage device, the source reader further operable to determine at least one of the chunks based on the first address and a length of the data, the source reader further operable to stream the at least one of the chunks corresponding to the data to a storage system, the source reader further operable to maintain a data structure that maps the at least one of the chunks to a storage identifier of the storage system, wherein a first backup set and a second backup set stored on the storage system are merged by sending a message to delete one or more blocks of the first backup set to the storage system and sending metadata to the storage system that indicates that other of the blocks of the first backup set are to be included in the second backup set, the source reader further operable to generate metadata regarding a backup dataset that includes the at least one of the chunks and providing the metadata regarding the backup dataset to the storage system prior to sending the at least one of the chunks, the metadata regarding the backup dataset indicating a location of the at least one of the chunks, the metadata regarding the backup dataset is used for obtaining the at least one chunk from the backup dataset even if other data of the backup dataset is not stored on the storage system.

16. The system of claim 15, wherein the source reader is further operable to divide a fixed-sized chunk into smaller chunks in preparation for performing a de-duplication transformation using the smaller chunks.

17. The system of claim 15, wherein the source reader is further operable to compress the at least one of the chunks prior to streaming the at least one of the chunks to the storage system.

18. The system of claim 15, wherein the source reader is further operable to encrypt the at least one of the chunks prior to streaming the at least one of the chunks to the storage system.

19. The system of claim 15, the data source further operable to provide an incremental backup by provide data and metadata that describes a change to a backup set, the source reader further operable to stream the data and metadata that describes the change in one or more chucks to the storage system.

* * * * *